United States Patent
McNerney et al.

(10) Patent No.: US 8,958,640 B1
(45) Date of Patent: Feb. 17, 2015

(54) IMAGE COLOR CAST CORRECTION USING GROUPS OF PIXELS

(71) Applicant: Google Inc., Mountain View, CA (US)

(72) Inventors: Peter J McNerney, Lomita, CA (US); Aravind Krishnaswamy, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/933,075

(22) Filed: Jul. 1, 2013

(51) Int. Cl.
*G06K 9/00* (2006.01)
*G06T 5/00* (2006.01)

(52) U.S. Cl.
CPC .......................... *G06T 5/00* (2013.01)
USPC .......................................................... 382/167

(58) Field of Classification Search
USPC ........... 382/162, 167, 254, 274; 358/1.9, 518, 358/537
See application file for complete search history.

(56) References Cited

U.S. PATENT DOCUMENTS

| | | | |
|---|---|---|---|
| 7,071,948 B2 | 7/2006 | Wilensky | |
| 7,359,572 B2 | 4/2008 | Liu | |
| 7,412,105 B2 | 8/2008 | Wilensky | |
| 7,684,096 B2 | 3/2010 | Gonsalves | |
| 2012/0314971 A1 | 12/2012 | Yuan | |

OTHER PUBLICATIONS

Xiao, Feng et al., "Preferred Color Spaces for White Balancing," Proceedings of SPIE-IS&T Electronic Imaging, SPIE vol. 5017, 2003, pp. 342-350.

*Primary Examiner* — Duy M Dang
(74) *Attorney, Agent, or Firm* — IP Spring

(57) ABSTRACT

In some implementations, a method provides color correction in images and includes determining multiple input groups of pixels of an image based on one or more pixel attributes of the pixels. Each of the input groups includes different pixels of the image than the other input groups. The method determines an individual neutral color associated with each of the input groups of pixels based on the colors of the pixels in the associated input group. An individual color correction associated with each of a number of output groups of pixels is determined based on one or more neutral colors associated with the input groups. The method applies each individual color correction to its associated output group of pixels, including adjusting the color of pixels in each output group to reduce color casts on the pixels.

20 Claims, 8 Drawing Sheets ent which may be used for one or more implementations described herein;

IMAGE COLOR CAST CORRECTION USING GROUPS OF PIXELS

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. Many captured images, however, have a color cast in which the colors are unbalanced or skewed in undesirable ways due to camera settings, lighting conditions, or other factors. It may become tedious for a user to manually examine each image and adjust the colors to desired values if needed. Some applications and devices provide an automated color correction function in which the colors of an image are analyzed and the colors in that image are shifted to provide a more accurate color reproduction. However, many such existing functions are limited in their ability to correct colors and/or may produce incorrect or undesirable changes in the colors of images.

SUMMARY

Implementations of the present application relate to color correction of images using groups of pixels. In some implementations, a method includes determining a plurality of input groups of pixels of an image based on one or more pixel attributes of the pixels, where each of the input groups of pixels includes different pixels of the image than the other input groups of pixels. The method determines an individual neutral color associated with each of the input groups based on the colors of the pixels in the associated input group. An individual color correction associated with each of a plurality of output groups of pixels is determined based on one or more of the neutral colors associated with the input groups. The method applies each individual color correction to its associated output group of pixels, including adjusting the color of one or more pixels in each output group to reduce color casts on the pixels.

Various implementations and examples of the above method are described. The input groups of pixels can correspond to and be the same as the output groups of pixels, or the input groups of pixels can be different in number or size than the output groups of pixels. Each input group of pixels can be associated with a different luminance range, and each of the input groups can include a different set of pixels of the image having luminance values within the luminance range associated with that input group. In some implementations, the input groups of pixels can correspond to input groups of pixels depicting highlights, mid-tones, and shadows in the image, respectively. In some examples, the input groups of pixels depicting highlights and shadows cover a smaller luminance range than the group depicting mid-tones. Some implementations can determine the luminance range for each input group dynamically based on a distribution of luminance values in the image.

Some implementations can apply a blended color correction to one or more pixels based on a plurality of individual color corrections determined for the input groups. For example, the blended color correction can be based on an individual color correction determined for the particular output group for that pixel, and can be based on an individual color correction determined for an output group associated with a luminance range numerically adjacent to a luminance range of that particular output group. Some implementations can protect selected pixels in at least one of the output groups from the applied color correction such that the color correction is reduced or not applied for the protected pixels. In some examples, the protected selected pixels can have a luminance value greater than a predetermined luminance threshold, and/or can have a saturation value that is lower than a predetermined saturation threshold.

A method can include, in some implementations, determining a plurality of groups of pixels of an image, where each of the groups of pixels is associated with a different luminance range, and each of the groups of pixels includes a different set of pixels of the image having luminance values within the luminance range associated with that group. The method determines an individual color correction for each group of pixels based only on the colors of the pixels in that group. Each individual color correction is applied to its associated group of pixels, including adjusting the color of one or more pixels in the groups to reduce color casts on the pixels of the groups.

In various implementations of the method, a blended color correction can be applied to one or more pixels based on a plurality of individual color corrections determined for the input groups. For example, for each of the one or more pixels, the blended color correction can be based on an individual color correction determined for the particular output group for that pixel and can be based on an individual color correction determined for an output group associated with a luminance range numerically adjacent to a luminance range of that particular output group. In some implementations, applying each individual color correction can include protecting selected pixels in at least one of the groups from the applied color correction such that the color correction is reduced or not applied for the protected pixels. In some examples, the protected selected pixels can have a luminance value greater than a predetermined luminance threshold, and/or can have a saturation value that is lower than a predetermined saturation threshold.

In some implementations, a system can include a storage device and at least one processor accessing the storage device and operative to perform operations. The operations include determining a plurality of input groups of pixels of an image based on one or more pixel attributes of the pixels, where each of the input groups of pixels includes different pixels of the image than the other input groups of pixels. An individual neutral color associated with each of the input groups of pixels is determined based on the colors of the pixels in the associated input group. The operations include determining an individual color correction associated with each of a plurality of output groups of pixels based on one or more of the neutral colors associated with the input groups. Each individual color correction is applied to its associated output group of pixels, including adjusting the color of one or more pixels in each of output groups to reduce color casts on the pixels of the output groups.

In various implementations of the system, each of the input groups of pixels can be associated with a different luminance range, where each of the input groups of pixels includes a different set of pixels of the image having luminance values within the luminance range associated with that input group. The operations can further include applying a blended color correction to one or more pixels based on a plurality of individual color corrections determined for the input groups.

DETAILED DESCRIPTION

Figure 1:
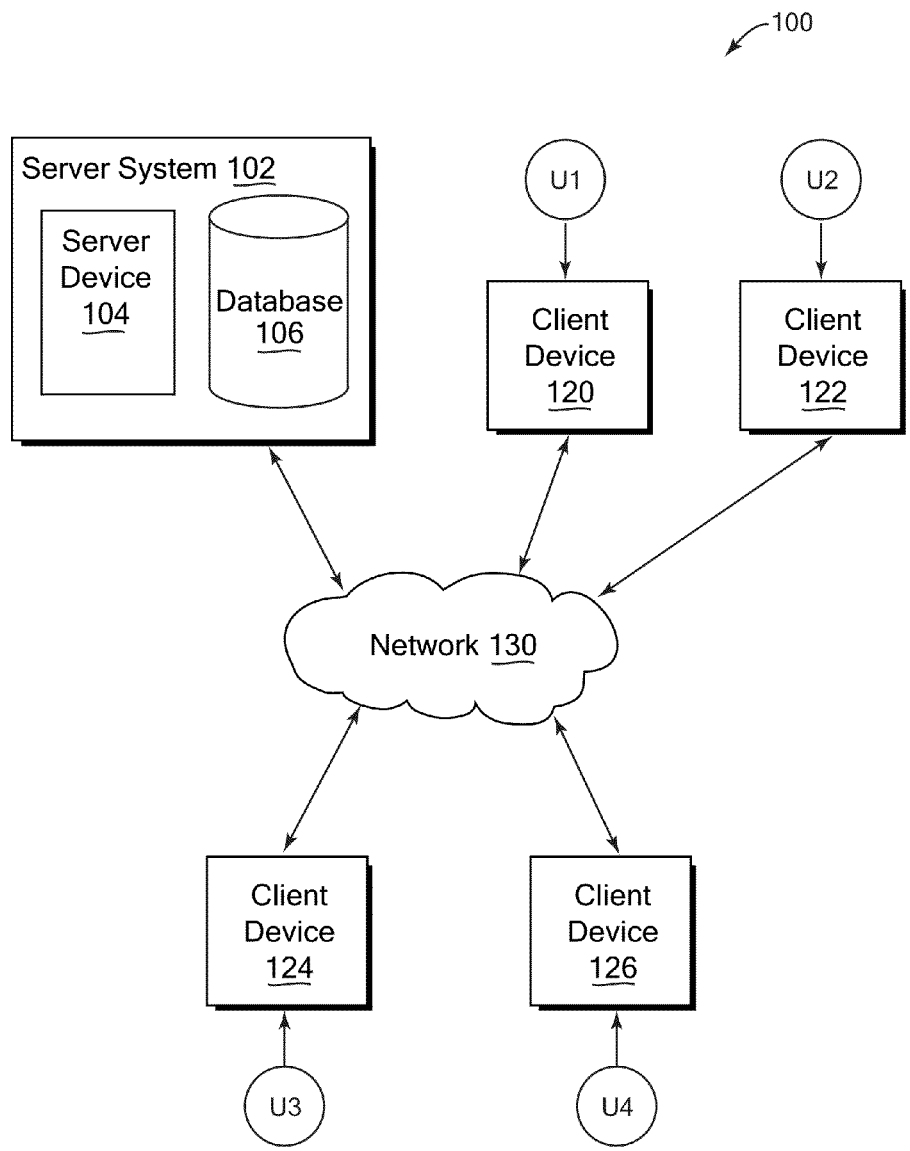
FIG. 1 is a block diagram of an example network environment which may be used for one or more implementations described herein.

Various implementations allow automatic high-quality color correction of images. A system can group pixels of an image into different groups and determines an individual neutral color and color correction for each of multiple groups of pixels. For example, the different groups can be based on the luminance of the pixels, where each group includes pixels of a particular luminance range. The system provides individually-tailored color cast correction to the different groups of pixels. Such correction of different groups of pixels allows high quality color cast correction of images. Furthermore, a system can provide features including blended color correction for pixels based on color corrections for groups adjacent in particular pixel attributes, and/or protection of particular pixels from the applied color corrections based on pixel attributes such as luminance and/or saturation values. These and other described features can provide automatically-determined, appropriate and high quality corrections to color casts in images.

In some implementations, a system can determine multiple input groups of pixels of an image to be used in providing pixels for determining individual color corrections, each correction based on one of the groups. Each of the input groups includes different pixels of the image than the other input groups. In some implementations, the pixels are arranged in input groups based on the luminance (e.g., brightness) of the pixels, such that each input group is associated with a different luminance range and includes a different set of pixels having luminance values associated with that group. For example, an entire luminance range of an image can be divided into sub-ranges, each sub-range associated with a different input group. In some examples, the input groups can correspond to luminance ranges for shadows, mid-tones, and highlights of an image, respectively.

The system can determine an individual neutral color for each of the input groups of pixels based on the colors of the pixels in each input group. For example, a neutral color can be determined for each group of pixels, which in some implementations can be a color averaged from the colors of the pixels in the group and weighted toward a color range close to a target color such as gray. The system can determine an individual color correction for each of multiple output groups of pixels based on the neutral colors determined for the input groups. In some implementations, the output groups of pixels can correspond to and be the same as the input groups, e.g., cover the same luminance ranges. In other implementations, the output groups of pixels can be different in size or number than the input groups of pixels. For example, the determination of color correction can include providing a transformation function based on the neutral color. The system applies the individual color corrections to the pixels in each output group. The color corrections include adjusting the color of one or more pixels in the output groups to remove color casts on the pixels of the groups.

In some implementations, the system can blend together colors of bordering pixels of different groups by applying a blended color correction to particular pixels. For example, a type of blending function can be used to reduce visible discontinuities in color between different groups of pixels caused by applying the individual color corrections. In some examples, a blended color correction can be determined based on individual color corrections in numerically adjacent luminance ranges. Some implementations can include a feature for protecting selected pixels in each group from the color correction applied to that group by omitting or reducing the application of the color correction to the protected pixels. For example, pixels having a luminance value greater than a predetermined luminance threshold (or alternatively, less than a luminance threshold) can be protected to reduce undesired color shifts to bright pixels such as particular highlights of the image. In some implementations, pixels having a saturation value lower than a predetermined saturation threshold can be protected, allowing reduction of undesired color shifts to colors near a neutral color, for example.

Such features allow automated correction of color casts (e.g., white balancing) for images having more accurate and desirable results. For example, individual color correction applied to particular pixel groups, e.g., in different luminance ranges, and based on the pixels within those groups (or within other relevant groups), allows more accurate and consistent color corrections of particular portions of images. For example, providing individualized color corrections in each of the shadow, mid-tone, and highlight regions of an image permits more accurate and desirable color correction tailored to each of those regions. Features described herein can more accurately and satisfactorily correct color in images, and require no manual corrections or adjustments by the user.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a social network database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, virtual reality or augmented reality glasses device, etc. In other implementations, network environment 100 may not have all of the components shown and/or may have other elements including other types of elements instead of, or in addition to, those described herein.

In various implementations, users U1, U2, U3, and U4 may communicate with the server system 102 and/or each other using respective client devices 120, 122, 124, and 126. In some examples, users U1, U2, U3, and U4 may interact with each other via a social network service implemented on server system 102, where respective client devices 120, 122, 124, and 126 transmit communications and data to one or more server systems such as system 102, and the server system 102 provides appropriate data to the client devices such that each client device can receive shared content uploaded to the social network service via the server system 102. In some examples, the social network service can use any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat with other users of the service, etc. As used herein, the term "social networking service" can include a software and/or hardware system that facilitates user interactions, and can include a service implemented on a network system. In some implementations, a "user" can include one or more programs or virtual entities, as well as persons that interface with the system or network.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations can use any type of system and service. For example, any type of electronic device can make use of features described herein. Some implementations can provide features described herein on client or server systems disconnected from or intermittently connected to computer networks. In some examples, a client device having a display screen can display images and provide features and results as described herein that are viewable to a user.

Figure 2:
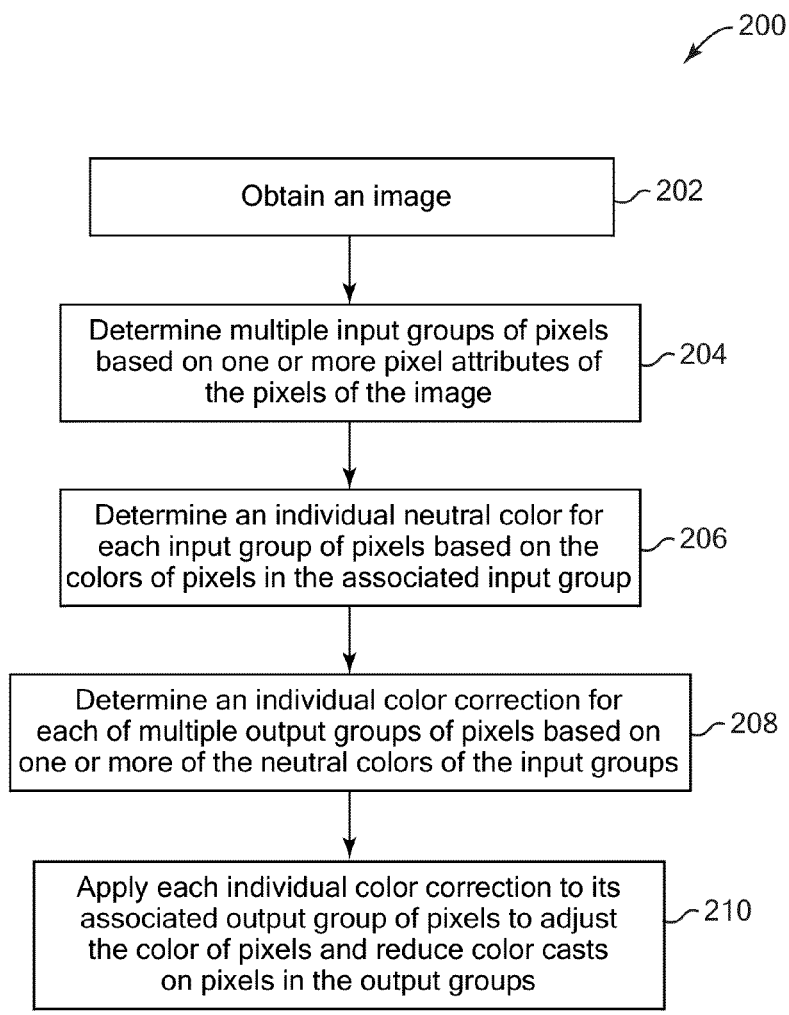
FIG. 2 is a flow diagram illustrating an example method for providing color cast correction for an image, according to some implementations.

FIG. 2 is a flow diagram illustrating one example of a method 200 for providing color cast correction for an image. In some implementations, method 200 can be implemented, for example, on a server system 102 as shown in FIG. 1. In other implementations, some or all of the method 200 can be implemented on a system such as one or more client devices, and/or on both a server system and a client system. In some examples, the implementing system includes one or more processors or processing circuitry and one or more storage devices such as a database 106. In some implementations, different components of one or more servers and/or clients can perform different blocks or other parts of the method 200. Method 200 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 200 can be performed as part of or component of an application running on the server or client device, or as a separate application or software running in conjunction with other applications and operating system.

The method 200 can be initiated by a user, such as a user providing or having access to source images. A user may, for example, provide input such as a selection for the initiation of the method 200 from an interface such as a social networking interface, application interface, or other graphical interface. In some implementations, the method 200 can be initiated automatically by a system, such as being periodically performed or performed based on a particular event occurring, such as one or more images being newly uploaded to or accessible by the system, or a condition specified in custom preferences of one or more users. In one non-limiting example, a camera, cell phone, or other portable client device can capture an image and can perform the method 200. In addition or alternatively, a client device can send a captured image to a server over a network, and the server can process the image using method 200.

In block 202, the method obtains an image for processing. The image can be a digital image composed of multiple pixels, for example, and can be stored on one or more storage devices of the system or otherwise accessible to the system, such as a connected storage device, e.g., a local storage device or storage device connected over a network. In some examples, the image can be a photo that was captured by a camera, or can be a synthetic image, e.g., a computer-generated image or user-created image. In various implementations, the image can be automatically selected by the method, e.g., as an image from an album or other collection of multiple images, such as an album provided in an account of a user of a social networking system. In some implementations, the system can determine which image to obtain based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

The obtained image may have one or more color casts associated with its colors. This can appear as an undesired tint or shift in colors in the image, such as a yellowish, reddish, or bluish tint, which causes the image to look differently than the original scene captured in the image and which can be caused by a variety of well-known factors. The entire image may have a similar color cast over all of its pixels. However, many images may have differing color casts in different areas or portions of the image. For example, an area that is lit brightly by sunlight may not show a color cast while other areas not as well-lit may show a color cast. Similarly, areas of the image depicting shadows and unlit areas may have a different color cast than other areas of the image.

In block 204, the method determines multiple input groups of pixels in the image based on one or more pixel attributes of the pixels of the image. The input groups can be determined based on ranges of one or more pixel attributes of the pixels in the image, where the particular pixel attribute(s) used can vary in different implementations. In some implementations, the input groups are determined based on a pixel attribute of luminance of the pixels in the image. For example, each input group can be associated with a different luminance range in the entire range of luminance values for the image. Each pixel of the image can be included in an appropriate input group that is associated with that pixel's luminance. In other implementations, other pixel attributes can be used to determine the input groups, such as saturation. All of the pixels of the image can be organized into the appropriate input groups based on the pixel attribute, or in other implementations, only a subset of the image's pixels can be so organized into groups.

In block 206, the method determines an individual neutral color for each input group of pixels based on the colors of the pixels in the associated input group. In some implementations, the neutral color is an averaged color determined from the input group of pixels and that is within a predetermined range of color around a desired target color, such as a gray value having its color channel values equal to each other. For example, the pixels in each input group are used to determine the neutral color for that group, while pixels outside that group are not used in this determination. This allows a neutral color to be determined based on relevant neighboring pixels that are within the pixel attribute range of that input group, thus providing a more relevant neutral color for that group. A neutral color may be different than other neutral colors determined for different input groups that cover different ranges of pixel attributes.

In block 208, the method determines an individual color correction for each of multiple output groups of pixels based on one or more neutral colors determined for the input groups. In general, each determined neutral color should ideally be the target color if no color cast were present, and so each neutral color is shifted a particular amount in each color channel to become that target color and remove the color cast. The pixels in each output group are shifted in the same way (e.g., the same magnitude and direction) as the neutral color associated with that output group to remove the color cast from the output group of pixels.

In some implementations, the output groups of pixels are designated to be the same as the input groups of pixels, e.g., the output groups cover the same ranges of pixel attributes corresponding to the input groups, so that the pixels used for determining the neutral color in an input group are the same pixels to which the color correction is applied in the output group corresponding that that input group. In other implementations, the output groups of pixels can be different than the input groups of pixels, e.g., the output groups can be associated with different sub-ranges of the pixel attribute than the input groups. For example, the output groups of pixels can be different in number and/or size (e.g., the size of the attribute sub-range covered) than the input groups. In one non-limiting example, an entire pixel attribute range may be divided into M attribute (sub)ranges and M corresponding input groups of pixels, and the entire attribute pixel range can be divided into N attribute (sub)ranges and N corresponding output groups of pixels. N can be the same as M in some implementations, and N can be different than M in other implementations (e.g., N can be less than M in some implementations). One or more of the determined neutral colors for the input groups can be used to determine color corrections in differently-sized or different numbers of output groups of pixels. In some implementations, one neutral color of an input group can be used to determine a color correction for one output group, while in other implementations, multiple neutral colors from multiple input groups can be used (e.g., averaged) to provide a color correction for one output group, or one neutral color of an input group can be used to provide a color correction for multiple output groups. In one example, N is greater than M, where an output group may cover the same luminance range as two input groups, and the neutral colors of the two input groups can be combined (e.g., averaged) to obtain a neutral color used to determine a color correction for the one corresponding output group. In another example, N is less than M and extrapolations can be performed on the neutral colors of the input groups based on the input group luminance ranges as compared to the output group luminance ranges, to obtain appropriate neutral colors for the M output groups.

In block 210, the method applies the individual color corrections to their associated output groups of pixels to adjust the color of the pixels in the output groups to reduce or remove color casts on those pixels. The color corrections can include a shift of the colors of one or more of the color channels of the pixels to compensate for any color cast of the pixels. For example, the color correction determined for a first output group of pixels may be different then a color cast determined for a second output group of pixels, where the individual color corrections are each more suited to their output groups of pixels. Some implementation examples of one or more blocks of method 200 are described below.

Figure 3:
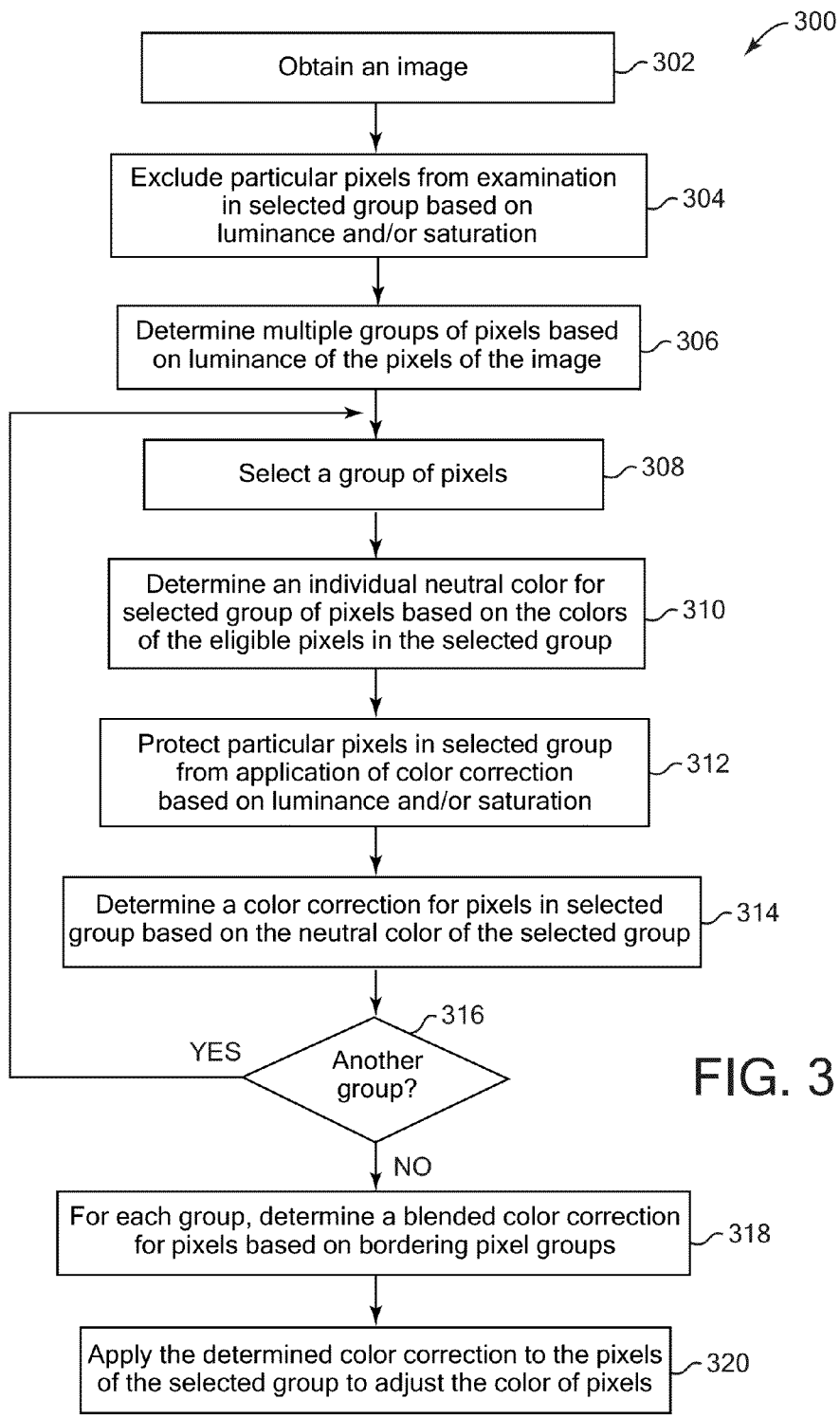
FIG. 3 is a flow diagram illustrating an example method of determining and applying color cast correction to an image, according to some implementations.

FIG. 3 is a flow diagram illustrating an example method 300 for determining and applying color cast correction to an image, according to some implementations. Method 300 can be implemented on one or more systems similarly as described above for method 200 of FIG. 2. In this example method, the input pixel groups are the same as and correspond to the output pixel groups described above in FIG. 2, and therefore the input groups and output groups are both referred to as pixel groups for this example.

In block 302, the method obtains an image similarly as described above for method 200. In block 304, the method can optionally exclude particular pixels from examination in the determination of neutral colors and color corrections as described below. These particular pixels can be excluded based on one or more pixel attributes. In one non-limiting example, some implementations can exclude pixels that have a luminance value greater than a predetermined threshold. This can allow, for example, very high luminance pixels in the highlight range of luminance values to be excluded from use in determining a color correction for that highlight range. Alternatively, some implementations can exclude pixels that have a luminance value below a predetermined threshold. In some implementations, pixels that have a saturation value in a predetermined range can be excluded, such as a saturation value below a predetermined saturation threshold. This can allow pixels that are closest to a gray color (desaturated) to not be used in color correction. The pixels excluded from examination in block 304 can also be excluded from application of the color correction (as in block 312 described below), or the set of pixels excluded from examination and the set of pixels excluded (protected) from application can be different. For example, in some implementations, pixels below the saturation value threshold can be used in the examination of colors in block 304 but can be protected from application of the color correction in block 312 below.

In block 306, the method determines multiple groups of pixels in the image, based on the luminance of the pixels in this example. In some implementations, the multiple groups can each cover a different range of luminance values in the entire luminance range of the pixels, such that the entire luminance range is covered by and associated with the groups. Various implementations can use different numbers of groups. For example, some implementations can use three groups, corresponding to luminances that are shadows (low luminance values), mid-tones (middle-range luminance values), and highlights (high luminance values). The groups can cover luminance ranges of different sizes, depending on the implementation. For example, in some implementations a range of shadow luminance values in one group is smaller, a range of mid-tone luminance values in a second group is larger, and a range of highlight luminance values in a third group is smaller. This can allow smaller shadow and highlight ranges to be corrected more accurately based just on pixels in those corresponding groups, while still removing those shadow and highlight pixels from consideration in the color correction determined for the mid-tone pixel group. In other implementations, a different number of ranges and groups of pixels can be used. For example, shadow and/or highlight luminance ranges larger than mid-tone ranges can be used. In another example, a mid-tone luminance range can be divided into multiple smaller luminance ranges within that mid-tone range, each smaller range associated with a different pixel group.

Furthermore, in some implementations any pixels excluded from examination in block 304 are not included in the determined input groups of pixels. For example, in some implementations in which particular luminances are excluded, pixels having these luminances are not included in any of the pixel groups determined in block 306. (In some examples, the excluded pixels determined in block 304 are not included in any pixel group and are removed from consideration in addition to pixels that are not considered for a group since they do not fall within the luminance range associated with that group.)

In some implementations, a predetermined number and size of luminance ranges and groups can be used for every image. For example, the luminance value ranges for each group can be static and predetermined, and these same group ranges can be used for every image that is analyzed for color correction. In other implementations or cases, the particular groups that are used to categorize the pixels can be determined based on an analysis of the particular image being processed, thus providing a dynamic number and/or size of pixel groups for each particular image that is processed for color correction. This analysis can be performed by a separate method or process and its results provided to method 300, or the method 300 can perform this analysis, e.g., in block 304.

In some examples, this analysis can examine the luminance values of the pixels of the image to determine a distribution of luminances, e.g., using a histogram or other method. Based on the distribution of luminance values, the number and size of the luminance ranges for the groups can be determined. For example, the method can start at one end of the luminance value range and traverse the luminance values sequentially, putting pixels from the image in a first group if their luminance values are equal to the selected luminances. After a predetermined number of pixels fill up a predetermined size of the first group, the method can then start a second group and continue putting pixels in the second group at each selected luminance value until that group is full, and so on. This provides luminance ranges for groups based on the pixel luminance values of the particular image examined. In some implementations, the method can examine the luminance ranges in a histogram and determine the distributions and create groups accordingly. For example, if a large number (e.g., above a threshold) of pixel luminance values are in a lower shadow range and there are few mid-tone and highlight luminance values present, a number of shadow luminance groups can be formed and a single group can be formed for the mid-tone and highlight luminance values. In some implementations, if the image includes large clusters of luminance values at particular values (e.g., a number of pixels over a threshold that are included in a cluster), then the number and/or size of luminance ranges and groups can be arranged based on those clusters.

In block 308, the method selects one of the groups of pixels for color correction. In block 310, the method determines an individual neutral color for the selected group of pixels based on the colors of pixels in the selected group. Similarly as described above for block 206 of FIG. 2, the pixels in each pixel group are used to determine the neutral color for that group, while pixels outside that group are excluded and not used in this determination. For example, the neutral color can be a representative color averaged from (or otherwise determined from) the pixel colors in the selected group, but need not actually be present in the image as a color of any pixel.

In some example implementations, a neutral color for the selected group of pixels can be determined by averaging pixel color channel values that are within a predetermined range of a desired target color, such as a gray color having its color channel values equal to each other. Some implementations can create one or more histograms based on color channel values of the pixels in the selected group and use the histograms to determine the neutral color. For example, using a RGB (red-green-blue) color space, a two-dimensional histogram can be created in which the ratios of a red channel value to a green channel value of certain pixels in the group are placed in one dimension or axis of the histogram, and the ratios of a blue channel value to the green channel value of those pixels in the group are placed in the other dimension or axis of the histogram. The pixels included in one axis of the histogram can be pixels of the selected group which have a ratio of red to green close to 1, e.g., having a ratio in a predetermined range of ratios (such as 0.5 to 2). Similarly, the pixels included in the other axis of the histogram can be pixels of the selected group which have a ratio of blue to green close to 1. These are pixels having red and blue values somewhat close to their green values. A known value can be assigned to the green channel for the neutral color, such as a midpoint value in the color range. In some implementations, the neutral color can be slightly adjusted to achieve a desired effect in the color corrected image. For example, a value slightly adjusted from the midpoint value can be assigned to the green channel if biasing the color correction in a particular way, e.g., if the desired color correction is to be "warmer" and closer to red values, "cooler" and closer to blue values, etc. Some implementations can weight the histogram counts. For example, a center of a 2D histogram can represent a target grey color (where the red, green and blue channel values are equal) and pixels in the center area be weighted more heavily, with a steep drop-off outside that center area. This provides more influence in neutral color determination to those pixels having colors closer to gray. The weighted ratios can then be averaged to obtain a weighted average ratio of red to green, and a weighted average ratio of blue to green. These average ratios can be multiplied by the assigned value of green to find the red and blue values for the neutral color of the selected pixel group.

In some implementations, the neutral color can be adjusted to achieve a desired effect in the color corrected image. For example, a desired color correction may be desired to be "warmer" and closer to red or yellow values, or "cooler" and closer to blue or cyan values, etc. This can be accomplished in some implementations by assigning to the green channel a value slightly adjusted from the midpoint value to bias the color correction in a particular way. In another example, a color channel of the neutral color such as red (or blue) can be biased to cause the corrected image to have colors shifted closer to red, or closer to cyan. Such an adjustment can be a constant amount and direction (e.g., warm or cool) of adjustment used for each image, or in other implementations can vary for each image. For example, the adjustment can be dynamically determined based on colors examined in the original image.

In other implementations, similar or other methods can be used to find a neutral color for the selected group of pixels based on the pixels colors of the pixels in that group. For example, other values instead of the green channel values can be assigned a target value, or other methods can be used to find an averaged neutral color representative for the selected group of pixels.

In block 312, the method can optionally exclude and protect particular pixels in the selected group from determination (and application) of the color corrections as described below in blocks 312 and 314. These protected pixels will not have a color correction determined (e.g., no blended color correction as described below determined for these pixels) and will not receive any color correction. For example, these particular pixels can be removed from their group before applying color correction(s) to the pixels in the groups. These particular pixels can be excluded based on one or more pixel attributes. In a non-limiting example, the protection can be based on a pixel attribute of luminance, e.g., pixels that have a luminance value greater than a predetermined luminance protection threshold are protected. This can allow, in one example, very high luminance pixels in the highest range of highlight luminance values (e.g., highest-value highlights) to be excluded from a color correction applied in that highlight luminance range. In some implementations, pixels that have a particular saturation value can be protected, such as a saturation value below a predetermined saturation threshold. This can allow, in one example, pixels that are close to a gray color (desaturated) to be protected from color correction, since these pixels may not have a significant color cast that needs correction.

In block 314, the method determines a color correction for the pixels of the selected pixel group based on the neutral color determined for the selected group. For example, in general, a color shift that is required for the neutral color to become the desired target color (such as an exact gray color) is determined and the same shift can be determined for the pixels of the selected group. The method can determine the amount of color cast of the representative neutral color for the selected pixel group and determine the corresponding color shift to remove that color cast. In some implementations, determining the color correction can include determining a transformation matrix or other transformation function based on the determined neutral color that can be applied to the pixels of the group to adjust their colors. In some examples, a transformation matrix can be determined based on ratios of the luminance of the neutral color to the individual color channel values of the neutral color. For example, the luminance of the neutral color can be divided by the red channel value of the neutral color, the luminance can be divided by the green channel value, and the luminance can be divided by the blue channel value to obtain the channel ratios. Those ratios can be provided in the transformation matrix. Some examples of transformations that can be used for some implementations are described in "Preferred Color Spaces for White Balancing" by Feng Xiao et al., Proceedings of SPIE-IS&T Electronic Imaging, SPIE Vol. 5017, 2003. Other implementations can use other transformations or methods to determine the color correction to be used to shift the pixels in the selected group based on the determined neutral color for the selected group.

In block 316, the method checks whether there is another group of pixels to examine and for which to determine a color correction. If so, the method returns to block 308 to select another group of pixels. If there are no more groups of pixels for which to determine a color correction, then the method continues to block 318.

In block 318, the method determines, for each pixel group, a blended color correction for one or more pixels of the group based on one or more bordering groups of pixels. A blended color correction can be desirable for some images. For example, if a different color correction is applied to a first group of pixels of the image that is numerically adjacent in its luminance range to the luminance range of a second group of pixels, then discontinuities or other undesired visual effects may appear in the image. Such different color corrections may cause two pixels close in luminance to show a noticeable discontinuity in color between those pixels in different groups and which are spatially close to each other in the image, e.g., such as in image areas having gradual changes in color. A blended color correction can therefore be applied to pixels close in luminance to other groups, where the blended color correction is based on the color corrections determined for each of the adjacent groups.

In some implementations, a "bordering" group is a group that is numerically adjacent in its luminance range to the luminance range of another group, and a "bordering" pixel is a pixel in a group that is closer in its luminance to the luminance range of another group than non-bordering pixels in that group. In some implementations, the pixels receiving the blended color correction can be bordering pixels that have a luminance value bordering another group's adjacent luminance range, where adjacent luminance ranges are adjacent numerically in the luminance value scale. For example, if a luminance range is divided into three sub-ranges of shadows, mid-tones, and highlights, then the pixels in the shadow range that have a luminance value close to the mid-tone luminance range can be bordering pixels. Similarly, pixels in the mid-tone range that have a luminance value close to the shadow luminance range, and pixels that have a luminance value close to the highlight luminance range, can be bordering pixels. Some implementations can provide a threshold luminance amount from each upper and lower end of a luminance range, such that pixels having a luminance value within the threshold can be considered a bordering pixel.

In some example implementations, bordering pixels suitable for blending can be those pixels having a luminance value between the center of the luminance range of a given group to one end of the luminance range of that group that is adjacent (luminance-wise) to another luminance range. Thus, for some groups, the bordering pixels can be all the pixels in the group except those pixels having center-valued luminance and/or pixels having a luminance value between the center value and an end of the entire luminance range of the image (e.g., having no adjacent luminance range at that end).

In some implementations, a blending can be performed on the color corrections for bordering pixels to obtain a blended color correction for each bordering pixel. In one example, a blended color correction can be performed based on contributions from one color correction determined for one pixel group as well as a different color correction determined for an adjacent-luminance group. For example, in implementations that determine a transformation matrix to adjust pixel values as described above in block 314, a blend of the two transformation matrices for the center luminance values of these two pixel groups can be made. In one example, a linear blend or other type of blending function can be used which provides a blended transformation matrix for each pixel having a luminance between the center values of two adjacent luminance ranges. In one example, the amount of correction contribution to the blend for each pixel is based on the luminance distance of that pixel from each of the luminance centers. For example, a pixel that has a luminance value exactly halfway between the center values of two adjacent pixel groups (e.g., a luminance on the border between the luminance ranges of these groups) can be assigned a blended transform matrix that has an equal contribution from both of the transform matrices of the center values of these pixel groups. In another example, a pixel that has a luminance value very close to a first center value of a pixel group can be assigned a color correction that is very close to the (non-blended) color correction associated with the center value, with little contribution from the adjacent color correction. Each bordering pixel in the image can have a blended color correction assigned in a similar way.

In block 320, the method applies the determined color corrections to the pixels of the groups to adjust or shift the color values of the pixels. This can shift the color values of the pixels and correct any color cast in these pixels based on the color correction as determined previously. Some of these color corrections may be blended color corrections as determined above. In example implementations in which a transformation matrix is used, as described above, the transformation matrix for a given pixel can be multiplied by the corresponding pixel color values for each pixel to transform each of the color channel values of the pixels. In some examples, the colors of a pixel can be multiplied by the associated transformation matrix. In addition, some implementations can use additional known transformations in the process of shifting the colors of pixels. In some examples, the color correction can include transforming the pixels from an original color space to an unbiased color space using a particular inverted color transform associated with a camera, multiplying the pixel values by the determined transformation matrix, and then transforming the pixel values back to the original color space using the camera color transform. According to features described herein, protected pixels as determined in block 312 can be skipped in the transformations so that the color correction is not applied to those pixels. In other implementations, other methods can be used to shift the colors of the pixels in the selected pixel group.

After applying the determined color corrections operation in block 320, the method ends.

In some implementations, the groups of pixels in method 300 of FIG. 3 can be provided as input groups and output groups similarly as described in FIG. 2, where input pixel groups can correspond to and be the same as the output pixel groups (as assumed in the example of FIG. 3 as described above), or in other implementations the input groups can be different in size and/or number than the output groups of pixels. For example, the blocks 304-310 can be performed for the input groups of pixels and the blocks 312-320 can be performed for the output groups of pixels. In some examples, the blocks 304-316 can be performed for a single input group and a single output group of pixels, then performed for the next input group and output group, and so on, followed by blending color correction determinations in block 318 after such input and output groups are processed. Alternatively, blocks 304-316 can be performed for a subset of input and output groups and then blending color corrections determined for those groups, and this can be repeated for each subset of input and output groups. In some examples of such implementations, a color correction of block 314 can be determined by transforming the colors of the pixels in an output group using a neutral color of an input group that corresponds to that output group (where input groups correspond to output groups), or using a neutral color of one or more input groups associated with or otherwise related to an output group (if input groups do not exactly correspond to output groups). For example, an input group may be related to an output group if the luminance range covered by the input group is included within, or includes, the luminance range of that output group.

It should be noted that the blocks described in the methods of FIGS. 2 and 3 can be performed in a different order than shown and/or simultaneously (partially or completely) with other blocks, where appropriate. In some implementations, blocks can occur multiple times, in a different order, and/or at different times in the methods. For example, the determination of color corrections, blended color corrections, and the applying of those color corrections can be combined and/or performed on a per pixel basis, per group basis, etc. In some implementations, the exclusion of pixels such as in block 304 and/or the protection of pixels as in block 312 can be performed at different times of method 300 and/or performed multiple times for each selected group. Some implementations can perform the blending operations of block 314 at other times in the method. In various implementations, methods 200 and/or 300 can be implemented on a server system 102 as shown in FIG. 1, and/or one or more client devices can perform one or more blocks instead of or in addition to a server system performing those blocks.

Figure 4:
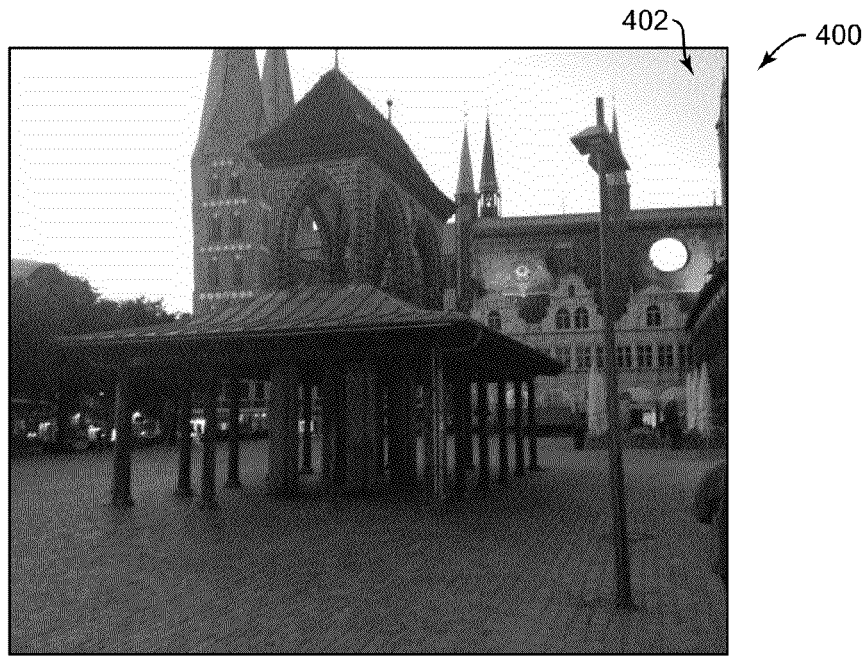
FIG. 4 is an illustration of an example image suitable for color cast correction.

FIG. 4 shows an example image 400 which can be corrected to reduce a color cast according to some implementations described herein. Image 400 can be displayed on a display device, e.g., of a client device 120, 122, 124, and/or 126 of FIG. 1, or a server system 102. In one example, a user can be viewing image 400 displayed by application program, operating system, or other service or system. The image 400 can be stored on one or more storage devices accessible to the displaying device, such as on the database 106 accessible to a displaying server system 102 or a storage system accessible to a displaying client device. For example, the user may have uploaded the image 400 to a social networking service, or otherwise provided the image for his or her account in such a service or other network service. The example images shown in FIGS. 5-11 can be similarly stored and displayed. The example images are color images that have been shown in grayscale with reduced visibility of some relevant features, and thus some characteristics and features related to color are indicated with reference to the descriptions below.

In the example of FIG. 4, the image 400 has been examined and its pixels grouped into a number of pixel groups. In this example, the input pixel groups used for examination of pixel colors are the same as and correspond to the output groups used for applying a color correction as described above with reference to method 300 of FIG. 3, and therefore all of the groups are referred to as pixel groups for this example. In this example, the image 400 has a bluish color cast for which features described above are to be used to correct.

Figure 5:
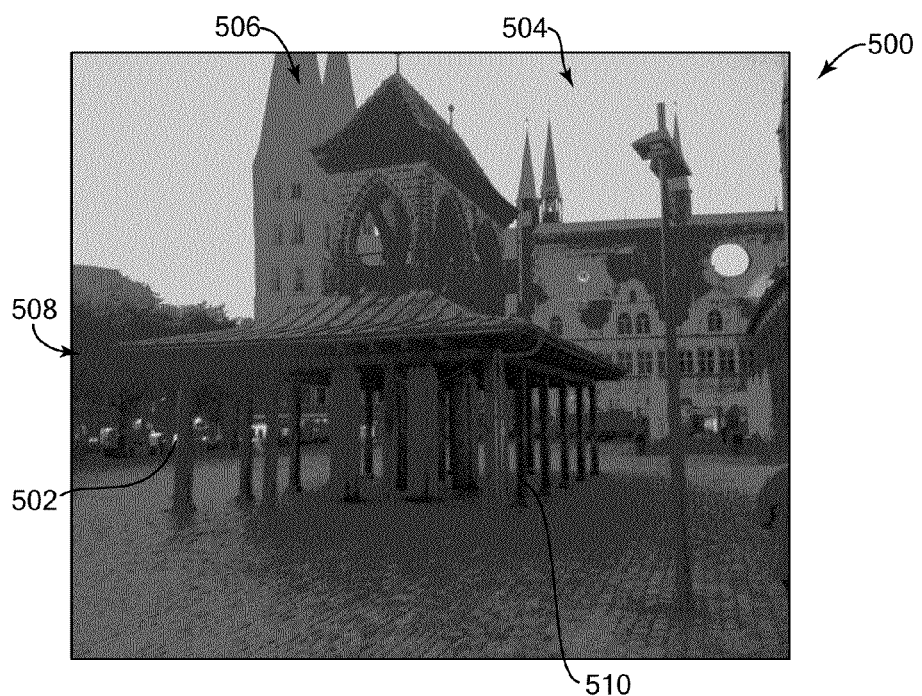
FIG. 5 is an illustration of a representation of the image of FIG. 4 indicating different groups of pixels.

FIG. 5 shows an example image representation 500 corresponding to image 400 and indicating a number of groups of pixels used to correct color casts of the image 400 as described herein. Each different group, represented by a different grayscale shade in the representation 500, covers a different luminance range of image 400, and the pixels in each luminance range are provided in the associated pixel group. In this example, five different groups are indicated, including a group 502 for a brightest highlight luminance range, a group 504 for the next lowest highlight range, a group 506 for a mid-tone range, a group 508 for a shadow luminance range, and a group 510 for the darkest shadow range. For example, shadow group 510 includes pixels that have a luminance value lower than a first shadow luminance threshold, shadow group 508 includes pixels higher than the first shadow threshold and lower than a second shadow threshold. Mid-tone group 506 includes pixels that have a luminance value above the second shadow threshold and below a first highlight luminance threshold. Highlight group 504 includes pixels that have a luminance value above the first highlight luminance threshold and below a second highlight threshold, while highlight group 502 includes pixels having a luminance value above the second highlight threshold.

Each of these groups is analyzed to determine an individual neutral color for that group, as described in example implementations above. An individual color correction is determined for each group based on the corresponding neutral color determined for that group. In some implementations, some pixels can be excluded and/or protected from the color correction processing as described above, such as pixels having very-high luminance (e.g., above a predetermined protection luminance threshold) and/or pixels having a low saturation (e.g., below a predetermined saturation threshold). For example, the highest-valued highlight group 502 may be protected in some implementations if it would be included in a group with lower-luminance pixels, thus preserving its color and avoiding color correction that would shift its colors inaccurately.

Figure 6:
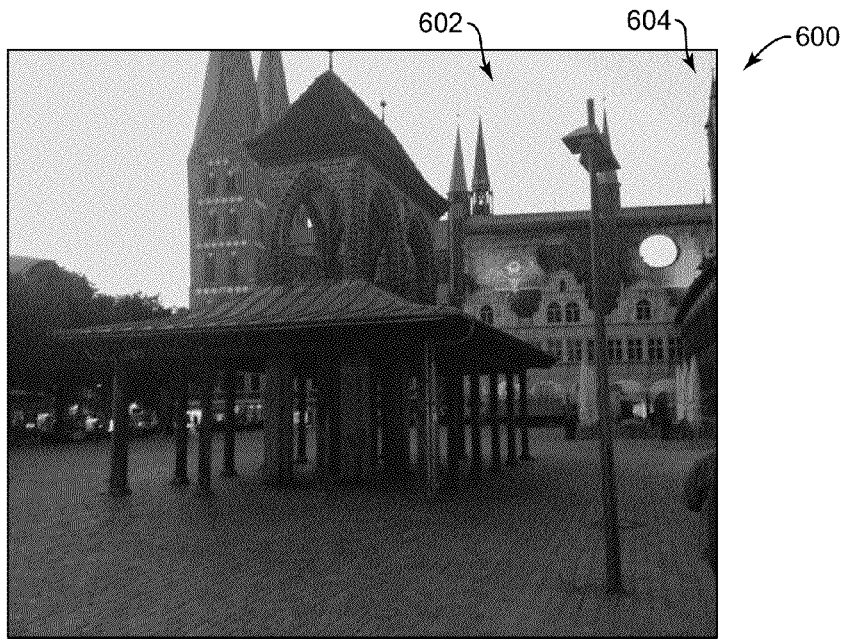
FIG. 6 is an illustration of an image resulting from color cast correction of the image of FIG. 4 using a method not including the pixel groups described herein.

FIG. 6 shows an example of an image 600 that has resulted from correcting a color cast of image 400 using a method that did not use individual color corrections for pixel groups as described herein. Image 600 resulted from using a method that determined a single neutral color and shifted the color of all the pixels of the image 400 by the same amount based on that neutral color. This has caused some portions of image 600 to be over-corrected in their colors. For example, the highlight region 602 of the depicted sky has been given an undesired and inaccurate yellowish cast from the color correction operation. In addition, features such as the bluish portion of sky in the area 402 of the image 400 have been undesirably removed by the color cast operation as shown in area 604 of FIG. 6.

Figure 7:
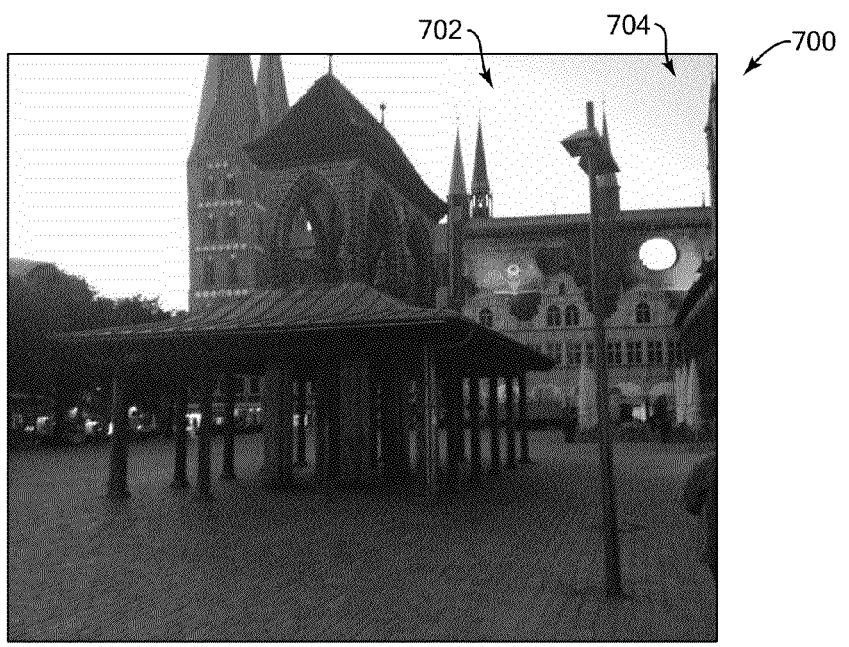
FIG. 7 is an illustration of an image resulting from color cast correction of the image of FIG. 4 using features described herein.

FIG. 7 shows an example of an image 700 that has resulted from correcting the color cast of image 400 using features described herein, including individual color correction using pixel groups. Each pixel group determined for image 400 as shown in FIG. 5 has had an individualized color correction applied. This allows, for example, the shadow pixel groups 508 and 510 of FIG. 5 to be corrected with a neutral color that is appropriate to each of these shadow regions. Similarly, the mid-tone group 506 is corrected using the pixels appropriate to that group, and the highlight groups 504 and 502 are likewise corrected. For example, the highlight sky area 702 has not been given a yellowish color cast as in the corrected image 600 of FIG. 6, because a color correction individualized for the pixel group 506 of FIG. 5 has accurately corrected the color in this area. Furthermore, the bluish portion of the sky in area 704 has been preserved. The use of such features presents a more desirable overall color correction for an image that reduces the over-correction of pixel regions as occurred in prior methods. Described features may be especially well-suited to some images having a large contrast in luminance, such as images depicting areas that are brightly lit in sunlight and areas that are much darker, such as areas in shadows.

Previous implementations of automatic color correction or white balancing can often produce undesirable changes in images since the system may only determine a single color correction. These implementations typically do not provide a suitable color correction for all the areas of the image. For example, an appropriate color correction for a highlight region may not be appropriate for a mid-tone or highlight region. By determining individual color corrections in different regions (such as different luminance ranges), more accurate color correction can be performed for all areas of an image.

Figure 8:
FIG. 8 is an illustration of another example image suitable for color cast correction.
Figure 9:
FIG. 9 is an illustration of a representation of the image of FIG. 9 indicating different groups of pixels.

FIG. 8 shows an example of another image 800 which can be color-corrected according to some implementations described herein. FIG. 9 shows an example image representation 900 corresponding to image 800 and indicating a number of groups of pixels used to correct color casts in the image 800 as described herein. For example, five different pixel range groups can be provided corresponding to different luminance ranges, similarly to the groups determined for FIG. 5.

Figure 10:
FIG. 10 is an illustration of an image resulting from color cast correction of the image of FIG. 8 using one or more features described herein and without using a blended color correction.

FIG. 10 shows an example of an image 1000 resulting from correcting the color cast of image 800 using features described herein, including using pixel groups determined for image 800 as described above for FIG. 9. Each pixel group shown in FIG. 9 has had an individualized color correction applied. However, image 1000 has not received blending color corrections between pixel groups, such as the blending color correction described above with reference to block 318 of FIG. 3. In this example, the image 1000 includes bordering areas 1002 which show a visual discontinuity in the color of the pixels as compared to colors of surrounding pixels. These areas 1002 include pixels having luminances that have had one color correction applied for their group, while the group of pixels in an adjacent luminance range has had a different individual color correction applied, causing the discontinuities. For example, areas of the image depicting clouds may have gradual color changes that can produce such discontinuities.

Figure 11:
FIG. 11 is an illustration of an image resulting from color cast correction of the image of FIG. 8 using features described herein including a blended color correction.

FIG. 11 shows an example of an image 1100 resulting from correcting the color cast of image 800 using features described herein and including use of blended color correction. In this example, bordering pixels have luminance values between the center luminance of one pixel group and the center luminance of another pixel group that covers an adjacent luminance range. The colors of the bordering pixels are corrected by determining a blended color correction (e.g., a blended transformation matrix) that is a blend of the two color transformations determined for the center pixels of these adjacent pixel groups. In this example, an individual blended color correction was determined for each bordering pixel based on the luminance "position" of the selected pixel in the span of luminance values between the center values. The blended color correction has a greater contribution from the correction of the closest center and a proportionally lesser contribution from the correction of the further center, for example. This blending causes reduction of visual discontinuities such as those shown in FIG. 10.

Figure 12:
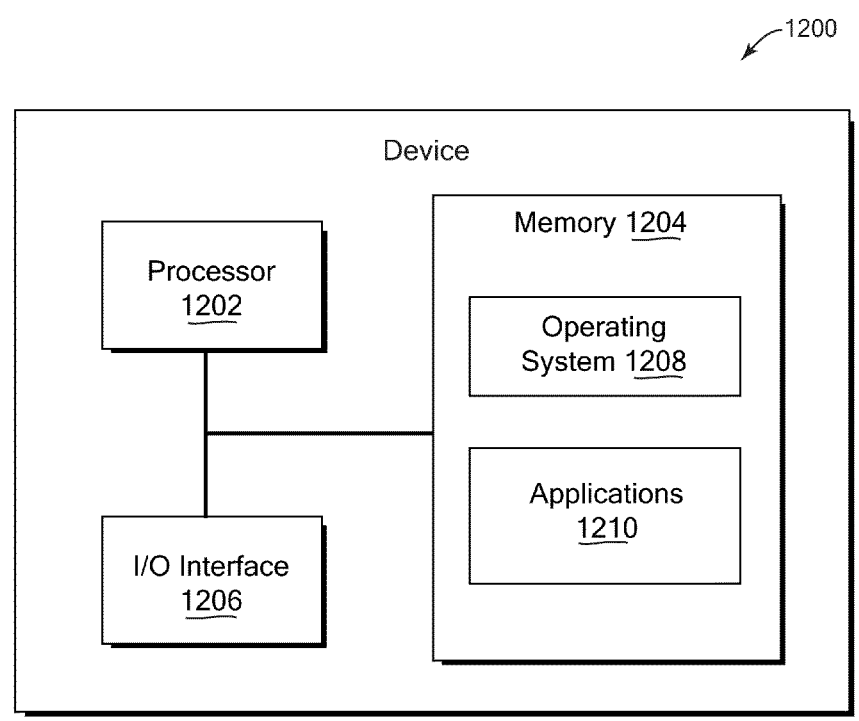
FIG. 12 is a block diagram of an example device which may be used for one or more implementations described herein.

FIG. 12 is a block diagram of an example device 1200 which may be used to implement some implementations described herein. In some examples, device 1200 may be used to implement server device 104 or a client device as shown in FIG. 1, and perform appropriate method implementations described herein. Device 1200 can be any suitable computer system, server, or other electronic or hardware device. For example, the device 1200 can be a mainframe computer, desktop computer, workstation, portable computer, or electronic device (portable device, cell phone, smart phone, tablet computer, television, TV set top box, personal digital assistant (PDA), media player, game device, etc.). In some implementations, device 1200 includes a processor 1202, a memory 1204, and input/output (I/O) interface 1206.

Processor 1202 can be one or more processors, e.g., processing circuits or circuitry, to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality (e.g., graphics processing unit (GPU)), or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the device 1200 by the processor 1202, including an operating system 1208 and an application engine 1210 in some implementations for implementing one or more applications (e.g., a social networking service or interface, or other applications). In some implementations, the application engine 1210 can include instructions that enable processor 1202 to perform the functions described herein, e.g., some or all of the methods of FIGS. 3 and/or 4. Any of software in memory 1204 can alternatively be stored on any other suitable storage location or computer-readable medium. In addition, memory 1204 (and/or other connected storage device(s)) can store images, other content, and other data used in the features described herein. Memory 1204 and any other type of storage (magnetic disk, optical disk, magnetic tape, or other tangible media) can be considered "storage devices."

I/O interface 1206 can provide functions to enable interfacing the device 1200 with other systems and devices. For example, network communication devices, storage devices such as memory and/or database 106, and input/output devices can communicate via interface 1206. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 12 shows one block for each of processor 1202, memory 1204, I/O interface 1206, and software blocks 1208 and 1210. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

Device 1200 can be a server system in some implementations. A client device can also or alternatively implement and/or be used with features described herein, such as any of client devices 120-126 shown in FIG. 1. Example client devices can include components as described above for device 1200, such as processor(s) 1202, memory 1204, and I/O interface 1206. An operating system, software and applications suitable for the client device can be provided in memory and used by the processor, such as client communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:
1. A method comprising:
   determining a plurality of input groups of pixels of an image based on one or more pixel attributes of the pixels, wherein each of the input groups of pixels includes different pixels of the image than the other input groups of pixels;

determining an individual neutral color associated with each of the input groups of pixels based on the colors of the pixels in the associated input group;

determining an individual color correction associated with each of a plurality of output groups of pixels based on one or more of the neutral colors associated with the input groups; and applying each individual color correction to its associated output group of pixels, wherein applying the individual color corrections includes adjusting the color of one or more pixels in each of the output groups to reduce color casts on the pixels of the output groups.

2. The method of claim 1 wherein the input groups of pixels correspond to and are the same as the output groups of pixels.

3. The method of claim 1 wherein the input groups of pixels are different in number or size than the output groups of pixels.

4. The method of claim 1 wherein each of the input groups of pixels is associated with a different luminance range, and wherein each of the input groups of pixels includes a different set of pixels of the image having luminance values within the luminance range associated with that input group.

5. The method of claim 4 wherein the plurality of input groups of pixels correspond to input groups of pixels depicting highlights, mid-tones, and shadows in the image, respectively.

6. The method of claim 5 wherein the input groups of pixels depicting highlights and shadows cover a smaller luminance range than the group depicting mid-tones.

7. The method of claim 1 wherein each of the input groups of pixels is associated with a different luminance range, wherein the luminance range determined each input group is determined dynamically based on a distribution of luminance values in the image.

8. The method of claim 4 further comprising applying a blended color correction to one or more pixels based on a plurality of individual color corrections determined for the input groups.

9. The method of claim 8 wherein for each of the one or more pixels, the blended color correction is based on an individual color correction determined for the particular output group for that pixel and is based on an individual color correction determined for an output group associated with a luminance range numerically adjacent to a luminance range of that particular output group.

10. The method of claim 1 wherein applying each individual color correction includes protecting selected pixels in at least one of the output groups from the color correction applied to the at least one output group such that the color correction is reduced or not applied for the protected pixels.

11. The method of claim 10 wherein the protected selected pixels have a luminance value greater than a predetermined luminance threshold.

12. The method of claim 10 wherein the protected selected pixels have a saturation value that is lower than a predetermined saturation threshold.

13. A method comprising:
determining a plurality of groups of pixels of an image, wherein each of the groups of pixels is associated with a different luminance range, and wherein each of the groups of pixels includes a different set of pixels of the image having luminance values within the luminance range associated with that group;

determining an individual color correction for each group of pixels based only on the colors of the pixels in that group; and applying each individual color correction to its associated group of pixels, wherein applying the individual color corrections includes adjusting the color of one or more pixels in the groups to reduce color casts on the pixels of the groups.

14. The method of claim 13 further comprising applying a blended color correction to one or more pixels based on a plurality of individual color corrections determined for the input groups.

15. The method of claim 14 wherein for each of the one or more pixels, the blended color correction is based on an individual color correction determined for the particular output group for that pixel and is based on an individual color correction determined for an output group associated with a luminance range numerically adjacent to a luminance range of that particular output group.

16. The method of claim 13 wherein applying each individual color correction includes protecting selected pixels in at least one of the groups from the color correction applied to the at least one group such that the color correction is reduced or not applied for the protected pixels.

17. The method of claim 16 wherein the protected selected pixels have a luminance value greater than a predetermined luminance threshold, or have a saturation value that is lower than a predetermined saturation threshold.

18. A system comprising:
a storage device; and
at least one processor accessing the storage device and operative to perform operations comprising:
determining a plurality of input groups of pixels of an image based on one or more pixel attributes of the pixels, wherein each of the input groups of pixels includes different pixels of the image than the other input groups of pixels;

determining an individual neutral color associated with each of the input groups of pixels based on the colors of the pixels in the associated input group;

determining an individual color correction associated with each of a plurality of output groups of pixels based on one or more of the neutral colors associated with the input groups; and applying each individual color correction to its associated output group of pixels, wherein applying the individual color corrections includes adjusting the color of one or more pixels in each of output groups to reduce color casts on the pixels of the output groups.

19. The system of claim 16 wherein each of the input groups of pixels is associated with a different luminance range, and wherein each of the input groups of pixels includes a different set of pixels of the image having luminance values within the luminance range associated with that input group.

20. The system of claim 16 wherein the operations further include applying a blended color correction to one or more pixels based on a plurality of individual color corrections determined for the input groups.

* * * * *